(12) United States Patent
Vetterli et al.

(10) Patent No.: US 10,925,434 B2
(45) Date of Patent: Feb. 23, 2021

(54) BREWING APPARATUS FOR PREPARING A HOT BEVERAGE

(71) Applicant: Franke Kaffeemaschinen AG, Aarburg (CH)

(72) Inventors: Heinz Vetterli, Wangen (CH); Mariano Turi, Zurich (CH); Simon Muller, Unterentfelden (CH)

(73) Assignee: Franke Kaffeemaschinen AG, Aarburg (CH)

( * ) Notice: Subject to any disclaimer, the term of this patent is extended or adjusted under 35 U.S.C. 154(b) by 195 days.

(21) Appl. No.: 15/760,881

(22) PCT Filed: Sep. 13, 2016

(86) PCT No.: PCT/EP2016/071585
§ 371 (c)(1),
(2) Date: Mar. 16, 2018

(87) PCT Pub. No.: WO2017/046099
PCT Pub. Date: Mar. 23, 2017

(65) Prior Publication Data
US 2018/0255961 A1 Sep. 13, 2018

(30) Foreign Application Priority Data
Sep. 18, 2015 (DE) .................. 10 2015 217 997.4

(51) Int. Cl.
*A47J 31/46* (2006.01)
*A47J 31/52* (2006.01)
(Continued)

(52) U.S. Cl.
CPC ......... *A47J 31/461* (2018.08); *A47J 31/0657* (2013.01); *A47J 31/52* (2013.01); *A47J 31/5255* (2018.08); *F16K 1/38* (2013.01)

(58) Field of Classification Search
CPC ........ A47J 31/46; A47J 31/0657; A47J 31/52; A47J 31/5255; A47J 31/461; A47J 31/42; A47J 31/3623
See application file for complete search history.

(56) References Cited

U.S. PATENT DOCUMENTS 5,249,773 A 10/1993 Feld
6,173,912 B1 1/2001 Gottlieb et al.
(Continued)

FOREIGN PATENT DOCUMENTS

CN 101311588 11/2008
DE 202006014317 3/2008
(Continued)

OTHER PUBLICATIONS

CN 101311588 english translation (Year: 2010).*
CN 101311588 drawings (Year: 2010).*
Stepper motor NPL (Year: 2013).*

*Primary Examiner* — Jason L Vaughan
*Assistant Examiner* — Amanda Kreiling
(74) *Attorney, Agent, or Firm* — Volpe Koenig

(57) ABSTRACT

In a method and an associated brewing apparatus for preparing a hot beverage, in particular a coffee beverage, a quantity of a flavoring source, in particular coffee powder, is introduced into a brewing chamber and then, in a brewing operation, a predeterminable overall quantity of brewing water is passed through the brewing chamber under pressure, in order to enhance the taste quality of the freshly brewed coffee beverages or at least to increase the consistency of the taste. During the brewing operation, a value for the volume flow of the brewing water upstream or downstream of the brewing chamber, and/or for the quantity of the brewing water which has already been passed through, or is still to be passed through, is determined continuously, or at least a number of times, and a controllable backpressure (Continued)

valve downstream of the brewing chamber is activated in accordance with the value determined. The backpressure valve is a motor-operated needle valve which the controller opens wider or closes by activating a corresponding drive motor.

17 Claims, 3 Drawing Sheets

(51) Int. Cl.
*F16K 1/38* (2006.01)
*A47J 31/06* (2006.01)

(56) References Cited

U.S. PATENT DOCUMENTS

| | | | |
|---|---|---|---|
| 6,382,083 | B2 | 5/2002 | Schmed |
| 8,124,150 | B2 † | 2/2012 | Doglioni Majer |
| 9,214,017 | B2 | 12/2015 | Turi et al. |
| 2008/0095904 | A1* | 4/2008 | Sullivan ............ A47J 31/4407 426/431 |
| 2010/0064900 | A1 | 3/2010 | Reyhanloo |
| 2014/0202338 | A1 | 7/2014 | Remo et al. |
| 2015/0216355 | A1* | 8/2015 | Duvall ............... A47J 31/52 99/282 |

FOREIGN PATENT DOCUMENTS

| | | |
|---|---|---|
| DE | 202013009305 | 1/2014 |
| EP | 0600558 | 8/1994 |
| EP | 0972480 | 1/2000 |
| EP | 1061253 | 12/2000 |
| EP | 1133944 | 9/2001 |
| EP | 1554958 | 7/2005 |
| EP | 2561778 | 2/2013 |
| GB | 2469873 | 3/2010 |
| JP | 6295189 | 5/1987 |
| JP | 2004174092 | 6/2004 |
| JP | 2008291928 | 12/2008 |
| JP | 2013165814 | 8/2013 |
| KR | 20120117529 | 10/2012 |
| WO | 2013037076 | 3/2013 |
| WO | 2015031828 | 3/2015 |

\* cited by examiner
† cited by third party

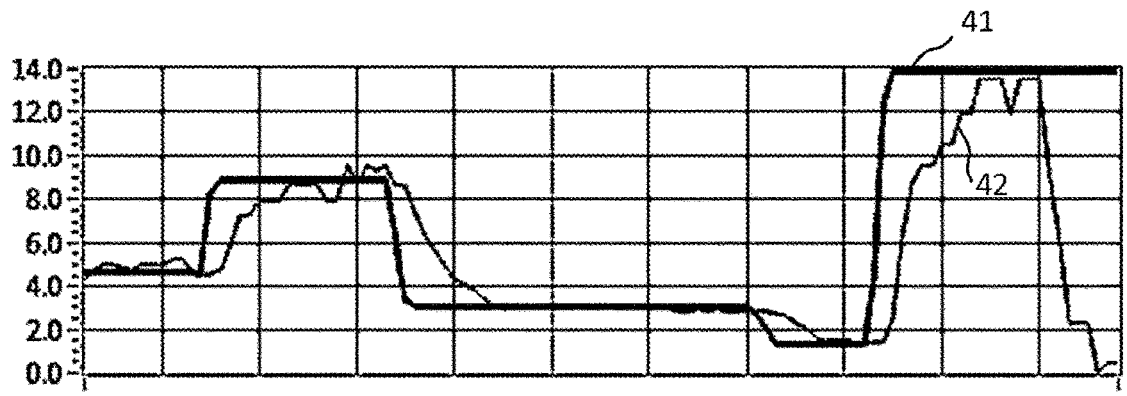
Fig. 3
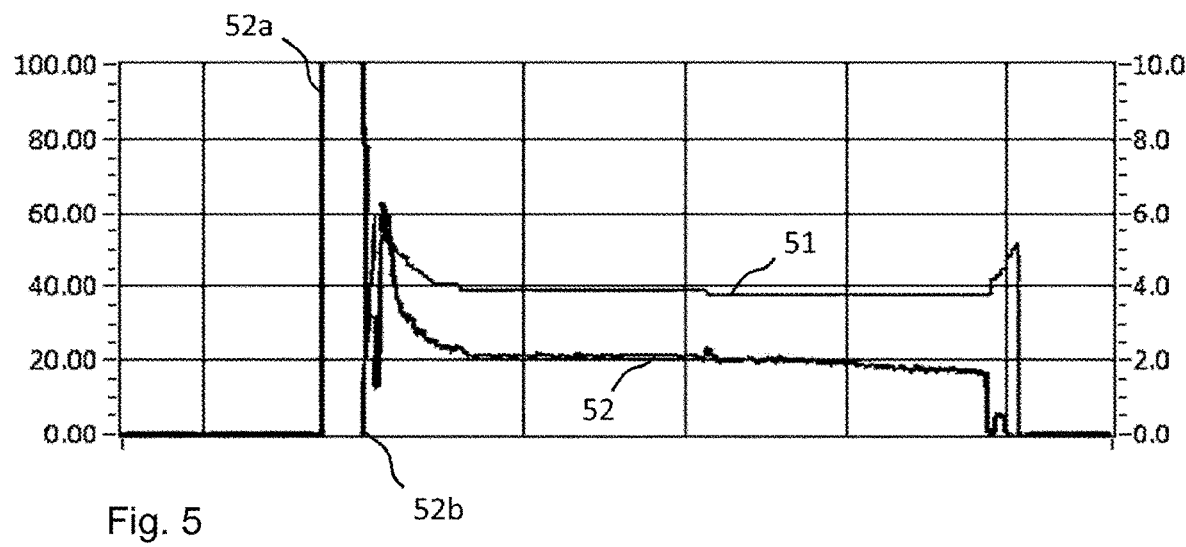
Fig. 4
Fig. 5

BREWING APPARATUS FOR PREPARING A HOT BEVERAGE

BACKGROUND

The present invention relates to a method for preparing a hot beverage, in particular a coffee beverage, and also to an associated brewing apparatus, in which method and brewing apparatus a pre-specifiable total quantity of brewing water is conducted through a quantity of a flavor carrier, in particular coffee powder, which is accommodated by the brewing chamber, under the application of pressure in a brewing process.

Commercially available coffee machines, such as fully automatic coffee machines or espresso machines, have a brewing chamber which is filled with coffee powder and in which the coffee powder may be compressed and through which hot water is then conducted through under pressure. In some cases, machines of this kind additionally have a grinding mechanism with which coffee beans can be freshly ground.

The pressure at which the hot water is conducted through the brewing chamber drops mainly across the coffee powder which is pressed in the brewing chamber, the "coffee mass", in the process. In some cases, it has also been proposed to provide a throttle valve, with which the pressure in the brewing chamber can be increased, downstream of the brewing chamber in order to obtain a better crema.

EP 1 133 944 B1 proposes providing a mechanical control valve downstream of the brewing chamber, in which mechanical control valve a spring attempts to keep a valve body in the open position, and in which mechanical control valve the valve body can be closed by the pressurized coffee beverage against the pretensioning force of the spring in the closing direction. The described control valve device serves to keep the relative throughflow rate constant within certain limits. The spring pretension and therefore the desired throughflow rate can be manually regulated by an adjusting screw.

It has been observed that the taste and quality of the brewed beverage is subject to severe fluctuations in the case of known coffee machines. In addition to the type and quantity of coffee used, the degree of grinding of the coffee and the degree of compression of the coffee powder in the brewing chamber have a significant influence on the taste of the brewed coffee beverage in currently commercially available coffee machines. However, in addition to this, it is often also observed that the taste and quality of the coffee which is dispensed first after the coffee machine has been inoperative for a relatively long time falls extremely short of expectations and even has to be thrown away. However, fluctuations in the quality and taste of the dispensed coffee beverages can also arise during continuous operation under otherwise constant conditions.

SUMMARY

Therefore, the object of the invention is to improve the taste quality of freshly brewed coffee beverages, however at least to improve the consistency in respect of the characteristic taste of coffee beverages which are prepared in succession.

The object is achieved by a brewing apparatus and a method including one or more features of the invention as discussed below.

A brewing apparatus according to the invention has a brewing chamber, to which pressure can be applied, for conducting a pre-specifiable total quantity of brewing water through a quantity of coffee powder which is accommodated by the brewing chamber, during a brewing process, and also has a measuring device, which is arranged upstream or downstream of the brewing chamber, for determining a volume flow rate of the brewing water or a quantity of the brewing water which has already been conducted through or is still to be conducted through, a controllable backpressure valve which is arranged preferably downstream of the brewing chamber in the throughflow direction, and a controller for actuating the backpressure valve depending on the value which is determined by the measuring device. In this case, the backpressure valve is in the form of a motor-operated needle valve which the controller further, that is to say for example gradually or in steps, opens or closes by actuating a corresponding drive motor.

Therefore, the present invention provides for active control of the backpressure which is generated by a backpressure valve which is arranged downstream of the brewing chamber in the flow direction, so that the pressure across the coffee mass which is contained in the brewing chamber can be kept substantially constant over the entire brewing process. In this case, the needle valve used according to the invention allows firstly particularly exact and secondly rapid-response control of the throughflow rate. On one hand, the active backpressure flow control allows regulation at a constant throughflow rate or a constant discharge volume flow rate during the brewing process. However, experiments carried out by the applicant have shown that the best results in respect of a coffee quality which is as constant as possible can be achieved by regulation at a constant total throughflow time of the brewing water as part of the brewing process.

Sensory experiments carried out by the applicant have shown that coffee beverages which are virtually identical in respect of taste and quality can be prepared given regulation at a constant throughflow time with coffee powder with different degrees of grinding. This is an unexpected and extremely surprising finding since it was previously assumed that the taste of a coffee beverage is substantially influenced by the degree of grinding, that is to say the particle size, of the coffee powder and coffee grounds which are as fine as possible had to be used primarily for preparing coffee beverages having an "espresso"-like taste. This is no longer necessary in the case of the present invention. The applicant has even been able to prepare coffee beverages having an "espresso"-like taste using somewhat coarser grounds, these coffee beverages being sensorily better than coffee beverages prepared using special, particularly fine espresso grounds, this being attributed, according to findings made by the applicant, to flavors being lost from the coffee due to excessively fine grinding.

Therefore, the backpressure flow control according to the invention is suitable for virtually completely compensating for differences in the degree of grinding of the coffee powder, so that technically substantially simpler and therefore more cost-effective grinding mechanisms can be used when preparing coffee beverages from freshly ground coffee beans.

Secondly, the backpressure flow control according to the invention allows beverages with different sensory characteristics to be extracted by deliberately changing the throughflow time while using coffee powder having the same degree of grinding. Furthermore, optimizing the discharge time with a substantially constant quality of the coffee beverage allows the use of smaller quantities of coffee powder, so that the backpressure flow control according to the invention also leads to coffee powder being saved.

Therefore, in one advantageous refinement of the invention, the quantity of the brewing water which has already been conducted through or is still to be conducted through is determined continuously or at least several times in order to actuate the backpressure valve depending on the quantity determined in this way, so that the brewing process is carried out in a pre-specifiable total throughflow time. Depending on whether still more or less brewing water has to be conducted through the brewing chamber given a pre-specifiable total quantity of brewing water in the time period remaining until the pre-specifiable total throughflow time is reached, the backpressure valve is opened again or closed again in order to increase or to reduce the volume flow rate.

The measurement variable and input value used for the backpressure flow control according to the invention can be measured volume flow rate values which are ascertained, for example, by a throughflow sensor which is located in the water inlet. The quantity of brewing water which has already been conducted through can be determined from said volume flow rate values in a particularly simple manner, for example by integration by a PID controller.

The needle valve expediently has a valve needle which is supported by a spindle and which can be axially moved in relation to a valve opening by adjusting the spindle. In particular, the spindle can be spring-loaded in relation to a spindle nut. A pretensioning spring of this kind, with which the spindle is pretensioned in relation to its spindle nut, serves primarily to cancel out spindle play which would otherwise be noticeable due to a rotation angle difference when opening and closing the valve. This is particularly advantageous when a stepper motor is used for driving the spindle.

The valve opening preferably has a diameter of from 1 to 5 mm, further preferably of from 1 to 3 mm. In this case, the valve needle can be of conically shaped design at least in sections and have an angle of inclination of from 2° to 10°, preferably 4° to 7°.

As already mentioned, the drive motor used is preferably a stepper motor. A stepper motor allows firstly rapid opening and closing of the valve and secondly very precise setting of the valve opening.

In this case, it is particularly advantageous if the stepper motor can be operated in a full step mode and a partial step mode. Said stepper motor can be actuated by the controller in such a way that said stepper motor runs in the full step mode in a first opening phase at the beginning of a product dispensing operation and in the partial step mode in a second phase during the product dispensing operation. Therefore, firstly, rapid opening at the beginning and also closing at the end of the product dispensing operation are ensured, and secondly very precise and fine control of the valve is possible during the product dispensing operation.

The controller is preferably designed to actuate the backpressure valve depending on the values which are determined by the measuring device in such a way that the brewing process is carried out and, respectively, completed at a pre-specifiable substantially constant throughflow rate, but preferably in a pre-specifiable total throughflow time. In particular, the controller can be in the form of a PID controller.

In a preferred development of the invention, the controller is programmed in a self-learning manner, so that it ascertains from previous brewing processes an amount by which a liquid throughflow through the backpressure valve in a start phase after the beginning of the brewing process has to be throttled once a liquid starts to flow in order to achieve the desired total throughflow time or an intended throughflow rate. Specifically, it has been found that a sharply fluctuating throughflow response, which may possibly be explained by thermal expansion effects or elastic material response in the region of the valve, has to be observed specifically in the start phase after the beginning of the brewing process. Particularly when using a needle valve which is driven by a stepper motor, the backpressure valve has to be adjusted, sometimes to a considerable extent, in the start phase in order to achieve the desired throughflow. Here, it has been found to be advantageous to learn from immediately preceding brewing processes and to take on the extent to which the valve has to be adjusted at the beginning of a product dispensing operation once the liquid starts to flow.

A further benefit and synergistic effect of the backpressure valve results from the backpressure valve being completely closed after conclusion of the brewing process. Dripping from the discharge line which is filled with coffee beverage, as is typically observed in the case of conventional coffee machines, is avoided in this case. However, it has further been found to be advantageous here to open the backpressure valve, which was closed after the product dispensing operation, again a pre-specified or pre-specifiable time period after conclusion of the brewing process. The valve needle can shrink onto or become stuck in the valve seat due to cooling specifically after conclusion of the product dispensing operation, particularly when using a very finely controllable needle valve. This is avoided by the needle valve being opened again in good time before significant cooling starts, for example 5 or 10 s after the product dispensing operation. A user will have typically already removed his drinking vessel containing the freshly dispensed coffee beverage after this time period and any beverage residues remaining in the discharge line can empty into the drip tray.

A further advantageous aspect results from the controller being programmed in such a way as to initialize that needle valve before the beginning of the brewing process by opening and then closing. This firstly ensures that the backpressure valve is in a defined state, the closed state. Secondly, it ensures, particularly in the case of a needle valve, that the valve has been closed with a defined closing force. In this way, fluctuation in the initial start-up response of the valve, which fluctuation may be due to the thermal material-elastic effects, is avoided and therefore the reproducibility of the start-up response is increased. If the valve is driven by a stepper motor, it may be expedient to actuate the stepper motor with a reduced coil current during closing of the valve, so that the operating force during closing is reduced and accordingly the risk of the valve becoming stuck or damaged during closing is reduced.

The measuring apparatus which supplies the measurement values for actuating the backpressure valve can preferably comprise a throughflow sensor. A throughflow sensor or flow meter measures the current throughflow rate or the volume throughflow rate through the pre-specified line cross section. The quantity of the brewing water which has already been conducted through can be determined by integration with respect to the volume flow rate. A corresponding throughflow sensor can preferably be arranged either in a fresh water supply line upstream of a water pump which is provided for conveying the brewing water and for generating pressure or between the water pump and a boiler for heating the brewing water. Arrangement of the throughflow sensor between the boiler and the brewing chamber would also be possible. A throughflow sensor of this kind can at the same time be used for portioning out the coffee beverage, that is to say for measuring out the pre-specifiable total quantity of brewing water, so that a further synergistic effect can be achieved as a result. A throughflow sensor of this kind is preferably located in the cold region, that is to say upstream of a boiler which is used for heating the brewing water, since the quantity of water can be measured most accurately at this point since it is not adversely affected by any steam bubbles and the accompanying increase in volume in the liquid.

However, in addition to measuring the throughflow rate, any other measurement variable with which the quantity of brewing water which has already been conducted through or is still to be conducted through can be ascertained can be determined and used. For example, a set of scales which weighs the quantity of coffee beverage which has already been dispensed into a beverage container could be arranged beneath the beverage container which is positioned beneath a discharge for the purpose of receiving the coffee beverage. Similarly, the pre-specified total quantity of brewing water could be filled into a pumping cylinder and pressed through the brewing chamber by a plunger. The quantity of brewing water which has already been conducted through the brewing chamber or is still to be conducted through the brewing chamber can be determined directly by the travel of the plunger in this case. Further measurement methods such as inductive or capacitive volume measurements are likewise covered within the scope of the present invention.

In a method for preparing a hot beverage, in which method a quantity of coffee powder is inserted into a brewing chamber and then a pre-specifiable total quantity of hot water is conducted through the brewing chamber under application of pressure in a brewing process, the object is achieved, according to the invention, in that a value for the volume flow rate of the brewing water upstream or downstream of the brewing chamber, and/or for the quantity of brewing water which has already been conducted through or is still to be conducted through, is determined continuously or at least several times during the brewing process, and a controllable backpressure valve which is arranged preferably downstream of the brewing chamber in the throughflow direction is actuated depending on the determined value.

In other words, the control parameter used is a value which is dependent on the current or accumulated throughflow rate of the brewing water and, according to the invention, is determined continuously or at least several times during the brewing process for the purpose of actuating and adjusting the backpressure valve.

BRIEF DESCRIPTION OF THE DRAWINGS

Further advantages and properties of the invention can be gathered with reference to the exemplary embodiments and the attached drawings, in which:

FIG. 3 shows a timing diagram for the control signals during a brewing process, FIG. 4 shows a time graph of the setpoint value and of the measured actual value of the backpressure flow control during a brewing process, FIG. 5 shows a time graph containing the profile of a control curve for the valve adjustment in steps of a stepper motor which serves to actuate the valve and the actual value of the throughflow rate which is measured by a throughflow sensor.

DETAILED DESCRIPTION OF THE PREFERRED EMBODIMENTS

Figure 1:
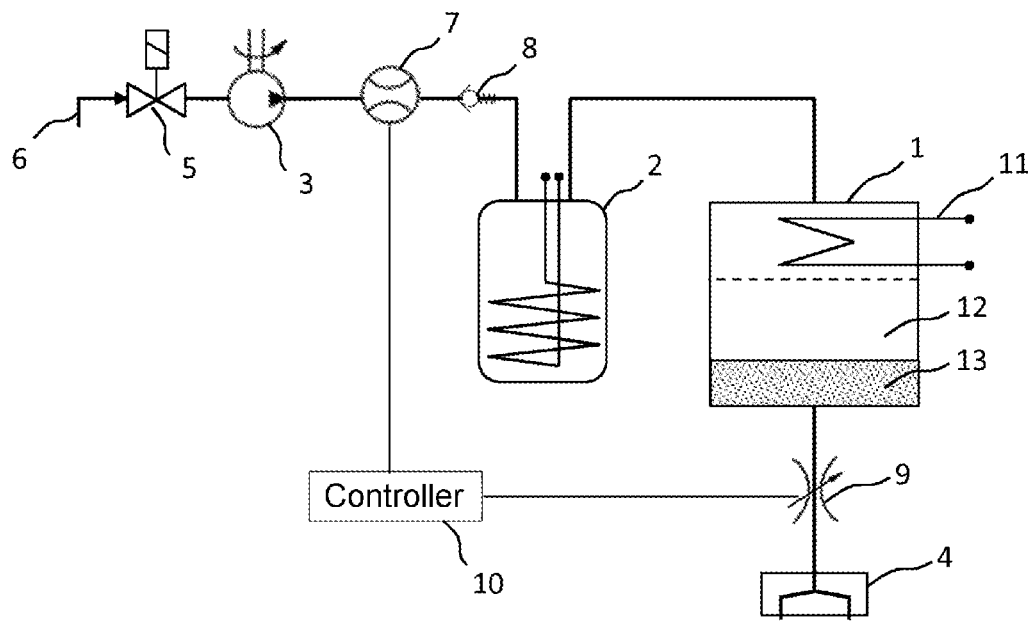
FIG. 1 shows a schematic water flow diagram of the brewing apparatus according to the invention.

FIG. 1 shows, in a so-called water flow diagram, the design of a brewing apparatus for preparing coffee beverages which can be used, for example, in a fully automatic coffee machine. The brewing apparatus comprises a brewing assembly 1, a hot water boiler 2, an inlet-side water pump 3 and a discharge 4 for dispensing freshly brewed coffee beverages. A main water valve 5, by which the brewing apparatus is connected to a drinking water supply line 6, is located upstream of the water pump 3 in the flow direction. At the delivery end, the pump 3 is connected to the inlet of the hot water boiler 2 by a throughflow sensor 7, often also called a flow meter, and a non-return valve 8. Hot water from the boiler 2 is supplied to the brewing assembly 1. A controllable backpressure valve 9, which is actuated by a controller 10 depending on the measurement values of the throughflow sensor 7, is located between the brewing assembly 1 and the discharge 4. In this case, the controller 10 can be realized by a microprocessor in which other open-loop and closed-loop control processes can be implemented in a fully automatic coffee machine.

The brewing assembly comprises, in a manner which is known per se, a heater 11 with which the brewing assembly is preheated and kept warm, and a brewing chamber 12 which is filled with portioned-out, freshly ground coffee powder 13. A brewing assembly, which can be used within the scope of the present invention, is described, for example, in EP 2561778 A1, the entire content of said document being incorporated by reference in order to avoid unnecessary repetition.

The brewing assembly 1 is designed such that it can be opened in order to insert a portioned-out quantity of coffee powder which has first been freshly ground in portions in a grinder of the fully automatic coffee machine. In addition, the remaining coffee grounds can be discarded into a grinds container after the brewing process when the brewing assembly is open. The brewing assembly also has a movable plunger (not illustrated) which compresses the inserted coffee powder against a brewing screen which is located in the brewing chamber. After the piston is retracted, pressurized brewing water can flow through the coffee powder which is compressed in this way.

The pressure which is generated by the pump 3 and at which the brewing water is conducted through the brewing chamber 12 is typically approximately 8 to 12 bar, without the invention being restricted to this however. In conventional coffee machines, this pressure of the brewing water drops across the coffee mass 13 which is compressed in the brewing chamber 12. The rate at which the brewing water runs through the coffee powder 13 is critically dependent on the degree of grinding of the coffee powder, the type of coffee, the quantity and the degree of compression in this case. However, in the brewing apparatus according to the invention, the pressure drop takes place primarily on the backpressure valve 9 which is arranged downstream of the brewing chamber 12 and with which the throughflow rate of the powder through the brewing chamber 12 is controlled in a targeted manner by the controller 10, specifically depending on the actual, measured throughflow rate in the throughflow sensor 7.

Figure 2:
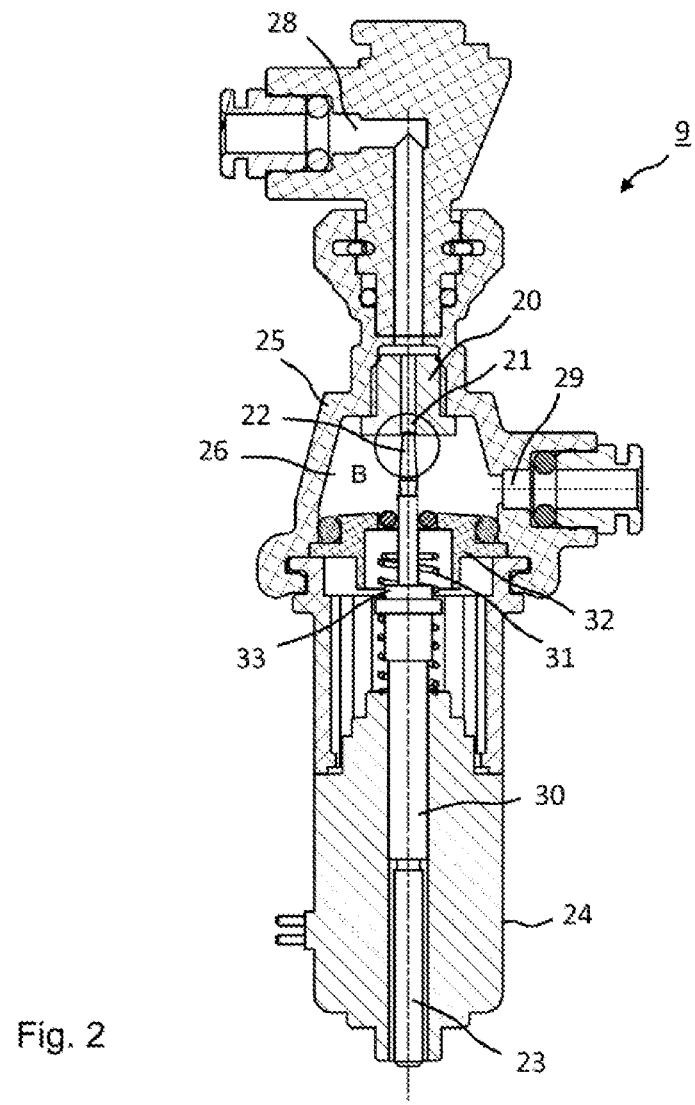
FIG. 2 shows a sectional illustration through a needle valve which is used within the scope of the invention for backpressure flow control.
Figure 2A:
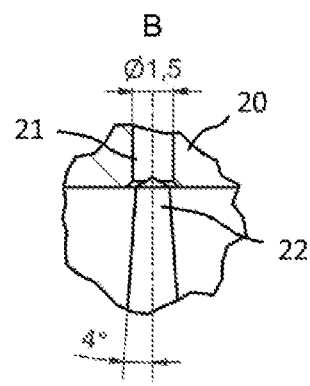
FIG. 2A shows a view of a detail of the valve needle and valve opening from FIG. 2.

In the exemplary embodiment, the backpressure valve 9 is in the form of a needle valve which is driven by a stepper motor and is illustrated in section in FIG. 2. The core element of the needle valve is a valve insert 20 with a continuous valve opening 21 which a valve needle 22 enters. These elements are illustrated in enlarged form in a detail B in FIG. 2A. In the exemplary embodiments, the valve opening 21 has a diameter of 1.5 mm. The valve needle 22 has a very steep angle of inclination of only 4°.

The valve needle 22 is supported by a spindle 23 which is driven by a stepper motor 24. The valve insert 20 and the valve needle 22 are accommodated in a valve housing 25 to which the stepper motor 24 is connected by a bayonet fitting. The valve chamber 26 which is formed by the valve housing 25 is sealed off at the bottom from the stepper motor 24. An inlet 28 which is connected to the brewing assembly 1 is located at the top end of the valve chamber 26. An outlet 29, which is connected to the discharge 4 of the coffee machine, is located on the side of the valve housing 25.

The spindle 23 interacts with a spindle nut 30 which is held on the housing of the stepper motor 24. A pretensioning spring 31, which is supported on a support plate 32 on the bottom side of the valve housing 25 and on a collar 33 which is connected to the valve needle 22, pretensions the valve needle 22 or spindle 23 against the spindle nut 30 and therefore cancels out any possible play in the spindle drive.

The valve housing 25, the valve insert 20 and the valve 22 are composed of plastic for hygiene reasons. In particular, high temperature-resistant thermoplastics, in particular PEEK (polyether ether ketone) have proven particularly suitable for the valve insert and the valve needle. As an alternative, the valve insert and the valve needle can also be produced from stainless steel. The valve housing can be composed of, for example, PPS or PPSU (polyphenylene sulfide or polyphenylene sulfone).

In order to achieve a suitable valve response, a valve needle with a conical profile is used, wherein the opening angle is between 2 and 15°. The best control response was ascertained with a valve needle having a conical profile with an opening angle of 4°, this being used in the exemplary embodiment.

The stepper motor 24 can be selectively actuated in full steps or in steps of one eighth. At the selected spindle transmission ratio, a full step corresponds to a stroke of 0.021 mm. The spindle stroke between complete opening and closing of the needle valve is approximately 100 full steps. The stepper motor is actuated in full steps for the purpose of rapid opening and closing. However, in control mode, this is changed to steps of one eighth. The stepper motor can also be actuated at a different coil current, 50 and 100 mA. For opening purposes and in control mode, the stepper motor is in each case actuated with the full coil current; when closing the needle valve, the coil current is lowered in order to close the valve with a lower force, so that the valve needle 22 does not become stuck in the valve opening 21 on account of the high needle steepness.

FIG. 3 shows the time sequence when actuating the brewing apparatus. Before the beginning of a product dispensing operation, the backpressure valve is completely open. If a product dispensing operation begins by a user performing a product selection operation and starting the preparation process using corresponding input means, the backpressure valve is closed. As explained, closing is performed in the full step mode with a reduced coil current. In the next step, the water pump starts up and generates a water pressure. Hot water from the boiler 2 now flows to the brewing assembly 1 until said brewing assembly is full. The backpressure valve 9 remains closed for this time. If the flow of water comes to a stop because the brewing assembly 1 is filled with water, the backpressure valve 9 is then opened and the brewing process begins.

Actuation of the stepper motor is now changed over to the mode performed in one eighth of a step and the backpressure valve is controlled by the controller 10 on the basis of the measurement values of the throughflow sensor 7. After conclusion of the brewing process, the water pump switches off. In addition, the backpressure valve is closed. This prevents any remaining liquid which may still be contained in the lines from dripping out of the discharge 4 of the coffee machine. The product dispensing operation is now concluded and the user is shown by a graphical user interface that he can remove the beverage container containing the selected beverage.

Finally, the throttle valve is completely opened again a predetermined time period after conclusion of the product dispensing operation. This has the background that, due to the high needle steepness and thermal expansion of the valve insert 20 and the valve needle 22, the valve needle 22 could become stuck in the valve opening 21 due to so-called shrinking-on. In a worst case scenario, it would no longer be possible to open the valve after cooling down. In order to prevent this, the valve is opened, as described, after conclusion of the product dispensing operation, but in good time before excessive cooling.

FIG. 4 shows, by way of example, the subsequent response of the actual value for the throughflow rate for manually set setpoint values. The bold solid line 41 represents the setpoint value, which is set by the valve opening of the backpressure valve 9, for the throughflow rate in milliliters per second (ml/s). The thin line 42 shows the actual values which are measured by the throughflow sensor 7. A slight time delay of approximately 0.8 seconds between the setpoint value curve 41 and the actual value curve 42 is the result of the throughflow sensor 7 being arranged upstream of the boiler 2 in the cold water region. As an alternative, a throughflow sensor could also be arranged directly upstream or directly downstream of the brewing assembly 1.

The time profile of the control curve and the actual value of the throughflow rate, which is measured by the throughflow sensor, during a product dispensing operation in the control mode which is carried out by the controller 10 are plotted in FIG. 5. The left-hand-side ordinate relates to the position of the needle valve in steps of the stepper motor. The associated valve position is illustrated as curve 51. The actual value curve 52 for the throughflow rate relates to the right-hand-side ordinate in milliliters per second (ml/s).

At the beginning of a product dispensing operation with the water pump switched on, the throughflow rate initially increases rapidly and reaches a peak value in a region 52a, without the backpressure valve 9 having been opened. This region, until the throughflow rate returns to zero again at a time 52b, relates to filling of the brewing assembly 1. As soon as the brewing assembly 1 is filled, the controller 10 opens the valve 9 until throughflow starts again. Due to the elastic properties in the valve and a large number of further effects, such as the valve needle possibly becoming stuck until opening, a relatively large number of motor steps are required for the purpose of initial opening of the backpressure valve 9. Depending on the operating situation of the needle valve 9, said motor steps may well be 20 to 40 stepper motor steps, for which reason this initial opening can preferably also be executed with a full step range.

After a current flow through the brewing chamber 12 initially starts, the backpressure valve 9 has to be immediately closed again to a certain extent. The control arrangement reacts very sensitively in this first start region. Thermal expansion and elasticity of the valve may, according to findings made by the applicant, be the reason that the control arrangement exhibits this oscillating response until it has stabilized. For this reason, it is advantageous for this start response to implement, after a volume flow starts, self-learning control which ascertains, from previous brewing processes, a measure for the number of steps for which the needle valve 9 has to be adjusted downward or closed again after initial opening and starting of the volume flow.

Coffee beverages with different backpressures and therefore different characteristic tastes can be brewed using the backpressure flow control according to the invention. The backpressure can be changed during the brewing process depending on the measured volume flow rate. For example, the volume flow rate can therefore be regulated at a constant, pre-specified or pre-specifiable discharge volume flow rate. However, due to the nondeterministic transient response, it has proven to be particularly advantageous to regulate at a constant discharge time, that is to say to accelerate or to decelerate the throughflow rate of the brewing water in a targeted manner depending on the brewing water which has already flowed through or is still to flow through, so that the pre-specified total throughflow time is achieved for a total quantity of brewing water, which is pre-specified for the selected beverage, overall. In this way, it is possible to ensure that all beverages of the same beverage type, for example espresso or lungo, are prepared with the same total throughflow time in each case. According to the findings of the invention, this leads to a very high degree of reproducibility and consistency in the coffee quality for a respectively pre-specified type of beverage.

For any type of beverage, it is possible to ascertain or test a throughflow time which is optimal in respect of the customer's wishes, the coffee quality being considerably improved by said throughflow time in comparison to conventional coffee machines. In addition, by virtue of optimizing the discharge time, a reduction in the quantity of coffee used can be at least partially compensated for, so that a saving in the amount of coffee required is achieved together with a comparatively consistent quality. Finally, differences in respect of the degree of grinding of the coffee have no effect or at best a minor effect on the coffee quality of the coffee beverage which is brewed according to the invention, so that less complicated grinding mechanisms can be used in fully automatic coffee machines according to the invention. Finally, experiments performed by the applicant have produced the astounding finding that even slightly better sensory results are achieved with somewhat coarser grinds than with the very fine grind used to date, in particular in the field of the espresso beverage type.

The longer the throughflow time is set using the backpressure flow control according to the invention, the higher the extraction yield of the non-volatile contents in the prepared coffee beverage and the greater the sensory perception with respect to the taste characteristics (acidity, bitterness) and also with respect to the astringency. This allows targeted control and optimization of the coffee beverage produced according to the invention.

Figure 6:
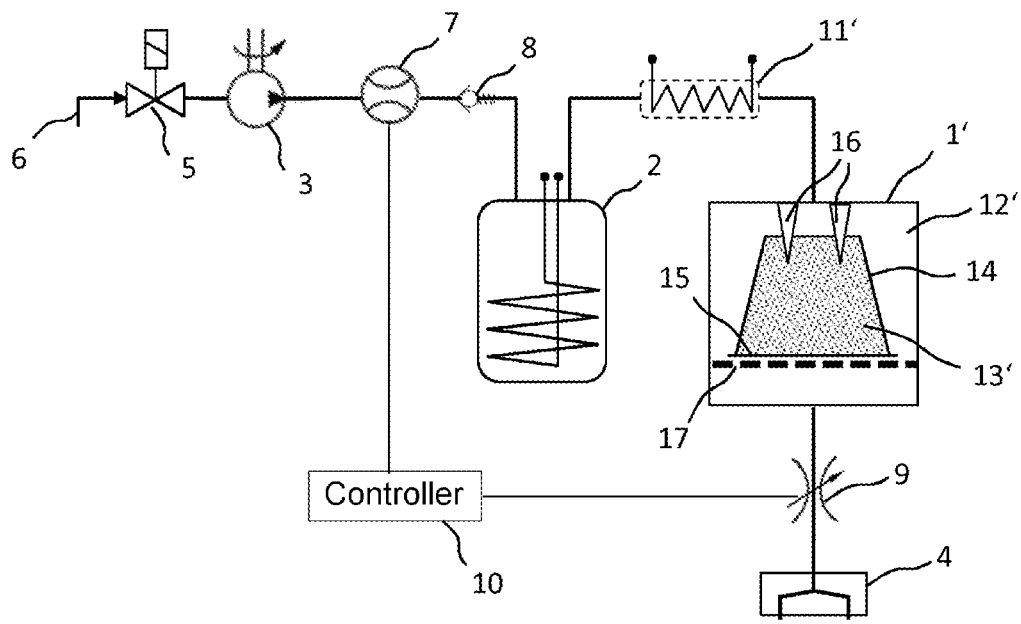
FIG. 6 shows a second exemplary embodiment of a brewing apparatus according to the invention.

FIG. 6 shows a further exemplary embodiment of a brewing apparatus according to the invention. In contrast to the brewing apparatus shown in FIG. 1, the one brewing unit 1' is designed for a single-serve coffee machine for operation with coffee capsules 14 here. The brewing chamber 12' is designed to receive coffee capsules. Coffee capsules of this kind can be manufactured from aluminum or plastic and are prefilled with portioned-out coffee powder 13' and sealed ex works, for example as shown in FIG. 6 by a membrane on the bottom side of the capsule 14.

In the exemplary embodiment, the brewing chamber 12' is, in a manner which is known per se, in the form of a capsule cage which encloses an inserted coffee capsule 14. On the top side, the capsule 14 is pierced by one or more spikes 16. This can be performed in an automated or manual manner. On the bottom side, the capsule is pressed against a carrier plate 17 which is provided with passages, a so-called pyramidal plate. After starting of the brewing process, hot water is pressed from the hot water boiler 2 into the capsule 14 under pressure. If the pressure within the capsule 14 is high enough, the membrane 15 on the bottom side of the capsule 14 gives way and the coffee beverage which is brewed within the capsule 13 can flow through the now perforated membrane 15 and the passages in the pyramidal plate 17 in the direction of the discharge 4. In addition or as an alternative to the hot water boiler 2, a throughflow heater 11' can be arranged in the water inlet of the brewing unit 1', the brewing water being heated or reheated by said throughflow heater.

As in the case of the first exemplary embodiment too, a backpressure valve 9 is arranged in the outlet line between the brewing chamber 12' and the discharge 4, it being possible for the throughflow to be controlled by the controller 10 depending on the values which are measured by the throughflow sensor 7. It is possible to regulate at a pre-specified flow rate, but preferably at a pre-specified total throughflow time of a pre-specified quantity of brewing water, by the backpressure flow control according to the invention in this case too.

Although the differences in the degree of grinding of the supplied coffee powder 13' play a less significant role in industrially produced and prefilled coffee capsules 14, in a capsule coffee machine a significantly higher consistency of the sensory characteristics of the quality of the dispensed coffee beverages can be ensured by the backpressure flow control according to the invention by setting an identical total throughflow time for all coffee beverages which are prepared in succession. In addition, the taste characteristics can be matched to the preferences of a user by varying or optimizing the total throughflow time.

It goes without saying that the backpressure flow control according to the invention can be used with any types of single-serve coffee machines, both those for operation using coffee capsules and also those for operation using coffee pods. Similarly, the quantity of brewing water which is to be conducted through can be changed and the total throughflow time can be accordingly adjusted, for example for the purpose of dispensing different coffee beverages or else for producing single or double servings, within the scope of the backpressure flow control according to the invention.

Very generally, the backpressure flow control according to the invention can also be used in all types of hot beverage systems, wherein hot beverages can be prepared not only with a proportion of coffee, but rather also with further types of flavors or flavor carriers, such as cocoa or tea.

The invention claimed is:
1. A brewing apparatus for preparing a hot beverage, comprising
    a brewing chamber (12) that is adapted to conduct a pre-specifiable total quantity of brewing water there- through and which is adapted to contain a quantity of a flavor carrier during a brewing process, a measuring device (7) arranged upstream or downstream of the brewing chamber (12) that is adapted to determine a volume flow rate of feed water to the brewing chamber or a quantity of the brewing water which has already been conducted through or is being conducted therethrough, a controllable backpressure valve (9) arranged downstream of the brewing chamber (12) in a throughflow direction, and a controller (10) configured to actuate the backpressure valve (9) in dependence on a value determined by the measuring device (7) in order to control a brewing water flow, and the backpressure valve is a motor-operated needle valve (9) and the controller (10) further opens the needle valve in order to increase the brewing water flow or closes the needle valve (9) in order to decrease the brewing water flow by actuating a drive motor (24).

2. The brewing apparatus as claimed in claim 1, wherein the needle valve (9) comprises a valve needle (22) supported by a spindle (23) and is axially moveable in relation to a valve opening (21) by adjusting the spindle (23), and the spindle (23) is spring-loaded in relation to a spindle nut (30).

3. The brewing apparatus as claimed in claim 2, wherein the valve opening (21) has a diameter of from 1 to 5 mm, and the valve needle (22) is of conical shape at least in sections and has an angle of inclination of from 2° to 10°.

4. The brewing apparatus as claimed in claim 1, wherein the drive motor (24) is a stepper motor.

5. The brewing apparatus as claimed in claim 4, wherein the stepper motor (24) is operable in a full step mode and a partial step mode and the controller (10) is configured to actuate the stepper motor (24) in the full step mode in a first opening phase at a beginning of a product dispensing operation and in the partial step mode in a second phase during the product dispensing operation.

6. The brewing apparatus as claimed in claim 4, wherein the controller (10) is configured to actuate the stepper motor (24) with a reduced coil current during closing of the needle valve (9), so that an operating force during closing is reduced.

7. The brewing apparatus as claimed in claim 1, wherein the controller (10) is configured to actuate the needle valve (9) depending on values which are determined by the measuring device (7) such that the brewing process is completed in a pre-specifiable total throughflow time.

8. The brewing apparatus as claimed in claim 1, wherein the controller (10) is a PID controller.

9. The brewing apparatus as claimed in claim 1, wherein the controller (10) is programmed to ascertain from previous brewing processes an amount by which a liquid throughflow through the needle valve (9) in a start phase after the beginning of the brewing process has to be throttled in order to achieve a desired total of throughflow time or throughflow rate.

10. The brewing apparatus as claimed in claim 1, wherein the controller (10) is programmed to close the needle valve (9) after a conclusion of the brewing process, and to reopen the needle valve (9) a pre-specified or pre-specifiable time period after the conclusion of the brewing process.

11. The brewing apparatus as claimed in claim 1, wherein the controller (10) is programmed to initialize the needle valve (9) before a beginning of the brewing process by opening and then closing the needle valve.

12. The brewing apparatus as claimed in claim 1, further comprising a water pump (3) that conveys the brewing water and generates pressure, and the measuring device comprises a throughflow sensor (7) which is arranged upstream of the water pump (3) in the flow direction or between the water pump (3) and the brewing chamber (1).

13. The brewing apparatus as claimed in claim 1, wherein the brewing chamber (12') is configured to receive coffee capsules (14), and the brewing apparatus includes an opener for the coffee capsules (14).

14. A coffee machine comprising a brewing apparatus as claimed in claim 1, and a grinding mechanism for grinding coffee beans into coffee powder.

15. A single serve coffee machine comprising a brewing apparatus as claimed in claim 1.

16. A capsule coffee machine comprising a brewing apparatus as claimed in claim 1.

17. A method for preparing a hot beverage, comprising the steps of:

inserting a quantity of a flavor carrier, into a brewing chamber (12), conducting a pre-specifiable total quantity of brewing water through the brewing chamber (12) under pressure in a brewing process, determining a quantity of the brewing water which has already been conducted through or which is being conducted through continuously or at least several times during the brewing process, and actuating a controllable backpressure valve (9) arranged downstream of the brewing chamber (12) in the throughflow direction that is provided as a motor-operated needle valve (9) by opening the backpressure valve in order to increase a brewing water flow or closing the backpressure valve in order to decrease the brewing water flow depending on a respectively determined quantity in order to complete the brewing process in a pre-specifiable total throughflow time.

* * * * *